(12) United States Patent
Rizzo et al.

(10) Patent No.: US 6,499,591 B1
(45) Date of Patent: Dec. 31, 2002

(54) GOLF CART WHEEL COVERING DEVICE

(76) Inventors: Vito Frank Rizzo, 713 Pennsylvania Ave., Lyndhurst, NJ (US) 07071; Dorothea Rizzo, 713 Pennsylvania Ave., Lyndhurst, NJ (US) 07071

( * ) Notice: Subject to any disclaimer, the term of this patent is extended or adjusted under 35 U.S.C. 154(b) by 0 days.

(21) Appl. No.: 09/765,654

(22) Filed: Jan. 22, 2001

(51) Int. Cl.[7] .................................................. B60B 7/02
(52) U.S. Cl. .................... 206/303; 150/154; 206/304.1; 206/335; 280/47.27; 301/37.101
(58) Field of Search ................................ 150/154, 159, 150/166–168; 152/524; 206/304, 304.1, 304.2, 315.3, 335, 579, 303; 215/317; 301/37.101, 37.102; 280/47.24, 47.26, 47.27, 47.28, 47.29

(56) References Cited

U.S. PATENT DOCUMENTS

| | | | | |
|---|---|---|---|---|
| 1,085,154 A | * | 1/1914 | Newsome | 301/37.101 |
| 1,755,133 A | * | 4/1930 | Rowe | 206/304.1 |
| D85,295 S | | 10/1931 | Mccormick et al. | |
| 1,910,416 A | * | 5/1933 | Wollheim | 206/304.1 |
| 1,967,522 A | | 7/1934 | Wengard | |
| 2,490,451 A | * | 12/1949 | Magid | 150/154 |
| 2,704,563 A | | 3/1955 | Henrich | |
| 2,849,045 A | | 8/1958 | Anderson | |
| 3,862,614 A | * | 1/1975 | Kovac | 215/317 |
| 4,126,169 A | * | 11/1978 | Magnuson et al. | 206/304.1 |
| 5,439,727 A | * | 8/1995 | Riggs et al. | 150/154 |
| 5,809,606 A | | 9/1998 | Macdonald et al. | |
| 5,921,449 A | | 7/1999 | Saegusa et al. | |
| 6,116,415 A | * | 9/2000 | Rastelli | 206/304.1 |

* cited by examiner

*Primary Examiner*—Jim Foster

(57) ABSTRACT

A golf cart wheel covering device for protecting the cart wheels of a golf cart from a ground surface during use. The golf cart wheel covering device includes a panel comprising a generally flexible material. The panel has a generally circular shape. The panel has a peripheral edge. An elastic band is securely coupled to and extends along a length of the peripheral edge of the panel. The elastic band biases the peripheral edge inward such that a housing is defined, wherein the elastic band encircles an opening into the housing. The elastic band has a stretched position and a relaxed position. The elastic band is stretched to position a golf cart wheel through the opening.

1 Claim, 3 Drawing Sheets

GOLF CART WHEEL COVERING DEVICE

BACKGROUND OF THE INVENTION

1. Field of the Invention

The present invention relates to golf cart wheel covering devices and more particularly pertains to a new golf cart wheel covering device for protecting the cart wheels of a golf cart from a ground surface during use.

2. Description of the Prior Art

The use of golf cart wheel covering devices is known in the prior art. More specifically, golf cart wheel covering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,921,449; 2,849,045; 2,704,563; 5,809,606; 1,967,522; and U.S. Des. Pat. No. 85,295.

While these devices fulfill their respective, particular objectives and requirements, the aforementioned patents do not disclose a new golf cart wheel covering device. The inventive device includes a panel comprising a generally flexible material. The panel has a generally circular shape. The panel has a peripheral edge. An elastic band is securely coupled to and extends along a length of the peripheral edge of the panel. The elastic band biases the peripheral edge inward such that a housing is defined, wherein the elastic band encircles an opening into the housing. The elastic band has a stretched position and a relaxed position. The elastic band is stretched to position a golf cart wheel through the opening.

In these respects, the golf cart wheel covering device according to the present invention substantially departs from the conventional concepts and designs of the prior art, and in so doing provides an apparatus primarily developed for the purpose of protecting the cart wheels of a golf cart from a ground surface during use.

SUMMARY OF THE INVENTION

In view of the foregoing disadvantages inherent in the known types of golf cart wheel covering devices now present in the prior art, the present invention provides a new golf cart wheel covering device construction wherein the same can be utilized for protecting the cart wheels of a golf cart from a ground surface during use.

The general purpose of the present invention, which will be described subsequently in greater detail, is to provide a new golf cart wheel covering device apparatus and method which has many of the advantages of the golf cart wheel covering devices mentioned heretofore and many novel features that result in a new golf cart wheel covering device which is not anticipated, rendered obvious, suggested, or even implied by any of the prior art golf cart wheel covering devices, either alone or in any combination thereof.

To attain this, the present invention generally comprises a panel comprising a generally flexible material. The panel has a generally circular shape. The panel has a peripheral edge. An elastic band is securely coupled to and extends along a length of the peripheral edge of the panel. The elastic band biases the peripheral edge inward such that a housing is defined, wherein the elastic band encircles an opening into the housing. The elastic band has a stretched position and a relaxed position. The elastic band is stretched to position a golf cart wheel through the opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf cart wheel covering device apparatus and method which has many of the advantages of the golf cart wheel covering devices mentioned heretofore and many novel features that result in a new golf cart wheel covering device which is not anticipated, rendered obvious, suggested, or even implied by any of the prior art golf cart wheel covering devices, either alone or in any combination thereof.

It is another object of the present invention to provide a new golf cart wheel covering device which may be easily and efficiently manufactured and marketed.

It is a further object of the present invention to provide a new golf cart wheel covering device which is of a durable and reliable construction.

An even further object of the present invention is to provide a new golf cart wheel covering device which is susceptible of a low cost of manufacture with regard to both materials and labor, and which accordingly is then susceptible of low prices of sale to the consuming public, thereby making such golf cart wheel covering device economically available to the buying public.

Still yet another object of the present invention is to provide a new golf cart wheel covering device which provides in the apparatuses and methods of the prior art some of the advantages thereof, while simultaneously overcoming some of the disadvantages normally associated therewith.

Still another object of the present invention is to provide a new golf cart wheel covering device for protecting the cart wheels of a golf cart from a ground surface during use.

Yet another object of the present invention is to provide a new golf cart wheel covering device which includes a panel comprising a generally flexible material. The panel has a generally circular shape. The panel has a peripheral edge. An elastic band is securely coupled to and extends along a length of the peripheral edge of the panel. The elastic band biases the peripheral edge inward such that a housing is defined, wherein the elastic band encircles an opening into the housing. The elastic band has a stretched position and a relaxed position. The elastic band is stretched to position a golf cart wheel through the opening.

Still yet another object of the present invention is to provide a new golf cart wheel covering device that is retrofittable to existing golf cart wheels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
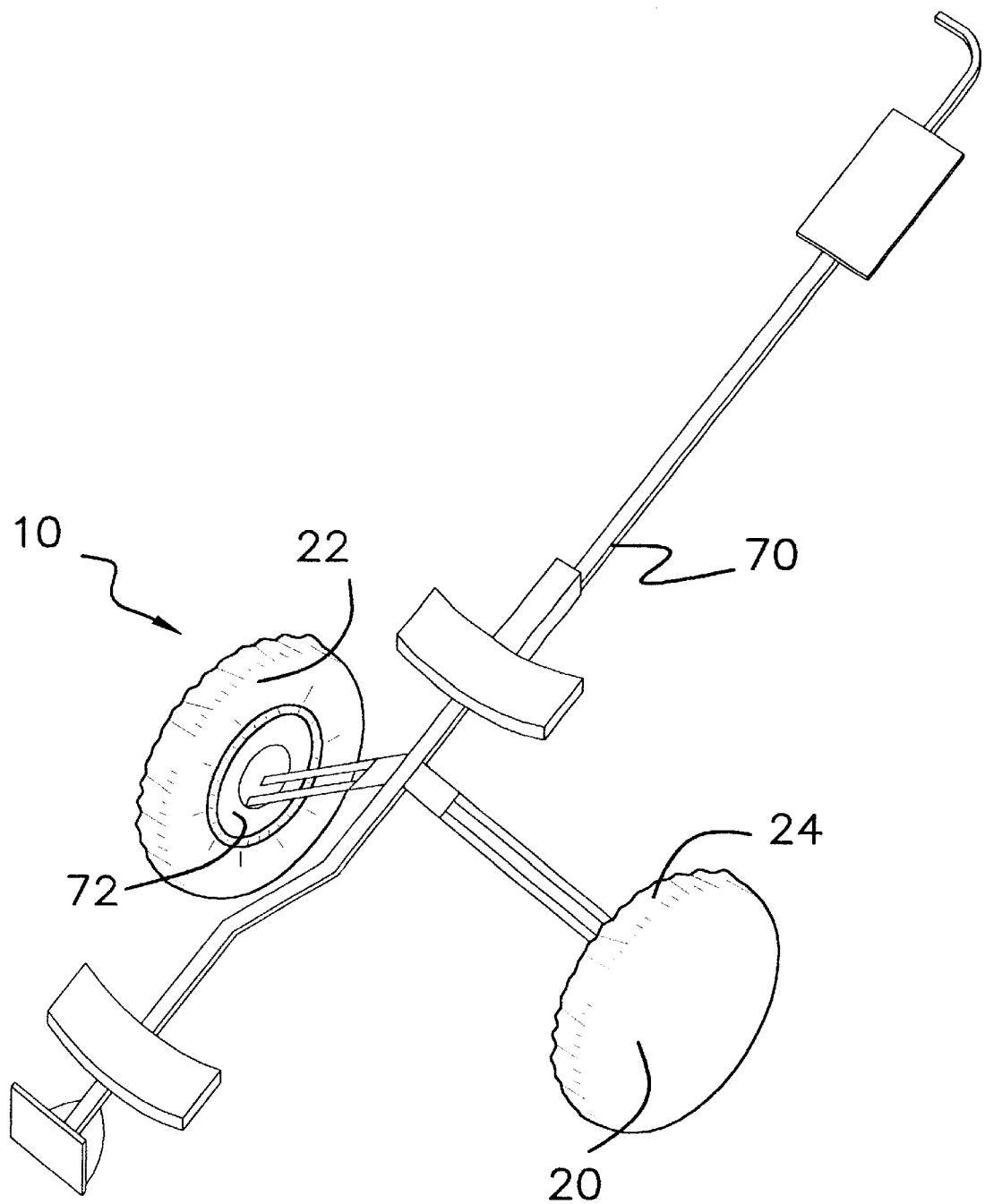
FIG. 1 is a schematic perspective view of a new golf cart wheel covering device according to the present invention.
Figure 2:
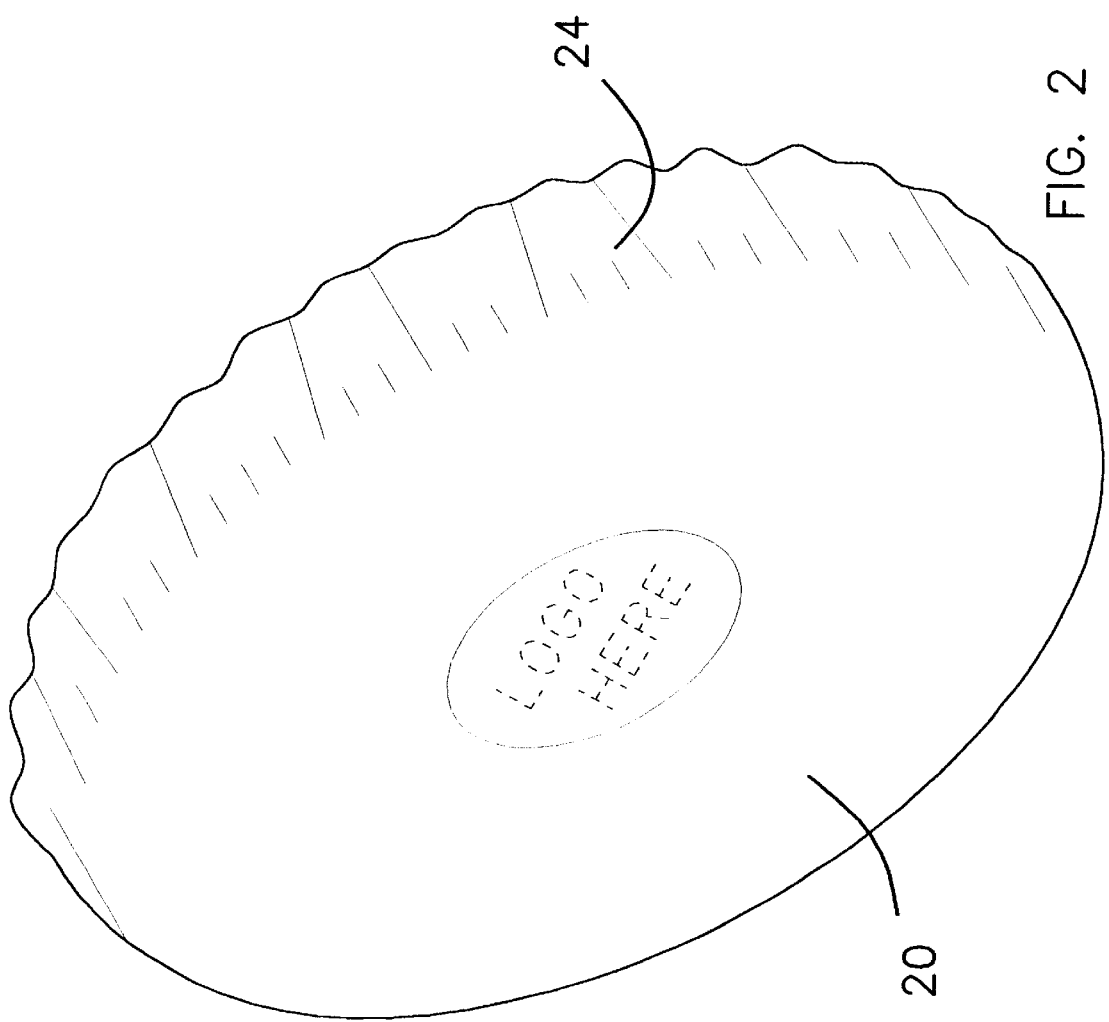
FIG. 2 is a schematic perspective view of the present invention.
Figure 3:
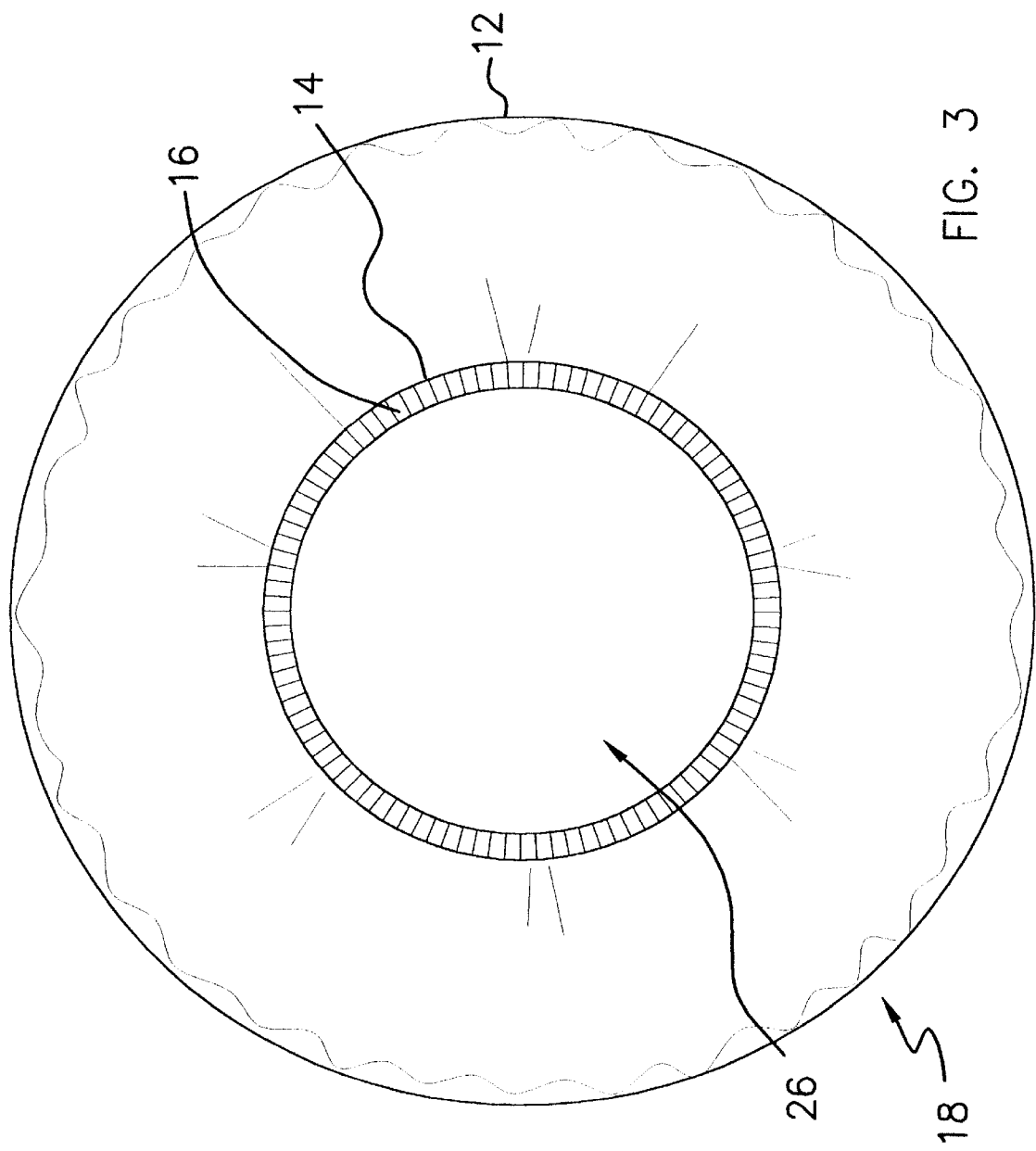
FIG. 3 is a schematic side view of the present invention.

With reference now to the drawings, and in particular to FIGS. 1 through 3 thereof, a new golf cart wheel covering device embodying the principles and concepts of the present invention and generally designated by the reference numeral 10 will be described.

As best illustrated in FIGS. 1 through 3, the golf cart wheel covering device 10 generally comprises a panel 12 comprising a generally flexible material. The panel 12 has a generally circular shape. The panel 12 has a peripheral edge 14. The panel 12 ideally has a diameter between 15 inches and 24 inches. The panel 12 preferably comprises a plastic material.

An elastic band 16 is securely coupled to and extends along a length of the peripheral edge 14 of the panel 12. The elastic band 16 biases, or pulls, the peripheral edge 14 inward such that a housing 18 is defined having a first wall 20, a second wall 22, and a peripheral wall 24 extending therebetween. The elastic band 16 encircles an opening 26 into the housing 18. The elastic band 16 has a stretched position and a relaxed position. The elastic band 16 is stretched to position a golf cart wheel 72 through the opening 26. The opening 26 has a diameter less than 6 inches when the elastic band in the relaxed position and the opening 26 generally faces a golf cart 70 on which the cart wheel 72 is rotatably coupled. The relaxed position forms an opening less than a diameter of the cart wheel 72 so that the cart wheel 72 stays within the housing formed by the panel 12.

In use, a pair of devices 10 is used at the same time. Each of the devices 10 is positioned over one of a pair of cart wheels 72 by positioning the cart wheels 72 through the openings 26. The device 10 prevents accumulation of dirt on the cart wheels 72. After use, the panels 12 may be removed from the wheels so that the golf cart 70 may be stored with relatively clean cart wheels 72.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. In combination:
   a golf cart having a pair of wheels rotatably mounted thereon; and
   a covering device removably positioned over each of the wheels of the golf cart, each of said covering devices comprising:
   a panel comprising a generally flexible material, said panel having a generally circular shape, said panel having a peripheral edge, said panel having a diameter generally between 15 inches and 24 inches, said panel comprising a plastic material; and
   an elastic band being securely coupled to and extending along a length of said peripheral edge of said panel, said elastic band biasing said peripheral edge inward such that a housing is defined wherein said elastic band encircles an opening into said housing, said elastic band having a stretched position and a relaxed position, wherein said elastic band is stretched to position said golf cart wheel through said opening, said opening having a diameter less than 6 inches when said elastic band in said relaxed position and said opening generally faces said golf cart;
   an indicia positioned on a first surface of said panel.

* * * * *